United States Patent
Scott

(10) Patent No.: US 9,062,655 B2
(45) Date of Patent: Jun. 23, 2015

(54) WIND TURBINE GENERATORS

(76) Inventor: Tom Scott, Bloomfield Hills, MI (US)

( * ) Notice: Subject to any disclaimer, the term of this patent is extended or adjusted under 35 U.S.C. 154(b) by 617 days.

(21) Appl. No.: 12/710,596

(22) Filed: Feb. 23, 2010

(65) Prior Publication Data

US 2010/0213722 A1 Aug. 26, 2010

Related U.S. Application Data

(60) Provisional application No. 61/208,409, filed on Feb. 24, 2009.

(51) Int. Cl.
F03D 3/04 (2006.01)

(52) U.S. Cl.
CPC .............. *F03D 3/0409* (2013.01); *F03D 3/049* (2013.01); *F05B 2240/40* (2013.01); *F05B 2250/70* (2013.01); *F05B 2250/712* (2013.01); *Y02E 10/74* (2013.01)

(58) Field of Classification Search
CPC ... F03D 3/0409; F03D 3/0418; F03D 3/0427; F03D 3/0436; F03D 3/0472; F03D 3/0481; F03D 3/049; F05B 2250/712
USPC .............. 415/4.4, 4.2, 4.1; 416/197 A, 197 R
See application file for complete search history.

(56) References Cited

U.S. PATENT DOCUMENTS

| | | | | |
|---|---|---|---|---|
| 4,764,683 | A * | 8/1988 | Coombes | 290/55 |
| 6,023,105 | A | 2/2000 | Youssef | |
| 6,160,336 | A | 12/2000 | Baker et al. | |
| 7,008,171 | B1 * | 3/2006 | Whitworth | 415/4.2 |
| 7,744,339 | B2 * | 6/2010 | Flores Lumbreras | 415/4.2 |
| 7,811,060 | B2 * | 10/2010 | Vanderhye | 416/120 |
| 7,847,428 | B2 * | 12/2010 | Platt | 290/54 |
| 7,866,938 | B2 * | 1/2011 | Kariya | 415/4.4 |
| 8,154,145 | B2 * | 4/2012 | Krauss | 290/54 |
| 2008/0217924 | A1 | 9/2008 | Boone | |

FOREIGN PATENT DOCUMENTS

| | | |
|---|---|---|
| JP | 2006090246 | 4/2006 |
| JP | 2007303337 | 11/2007 |

\* cited by examiner

*Primary Examiner* — Nathaniel Wiehe
*Assistant Examiner* — Jeffrey A Brownson
(74) *Attorney, Agent, or Firm* — MacMillan, Sobanski & Todd, LLC

(57) ABSTRACT

Several embodiments that enhance and improve the efficiencies of vertical axis wind turbine generators by expanding their normal range of useful operations. Stationary vanes provided external to the rotor blades provide directional control of wind/air flow into the blades for decreased drag and increased differential wind pressure. Control scenarios for adjusting stationary wind vanes and additional ducting of air to increase efficiencies.

18 Claims, 6 Drawing Sheets

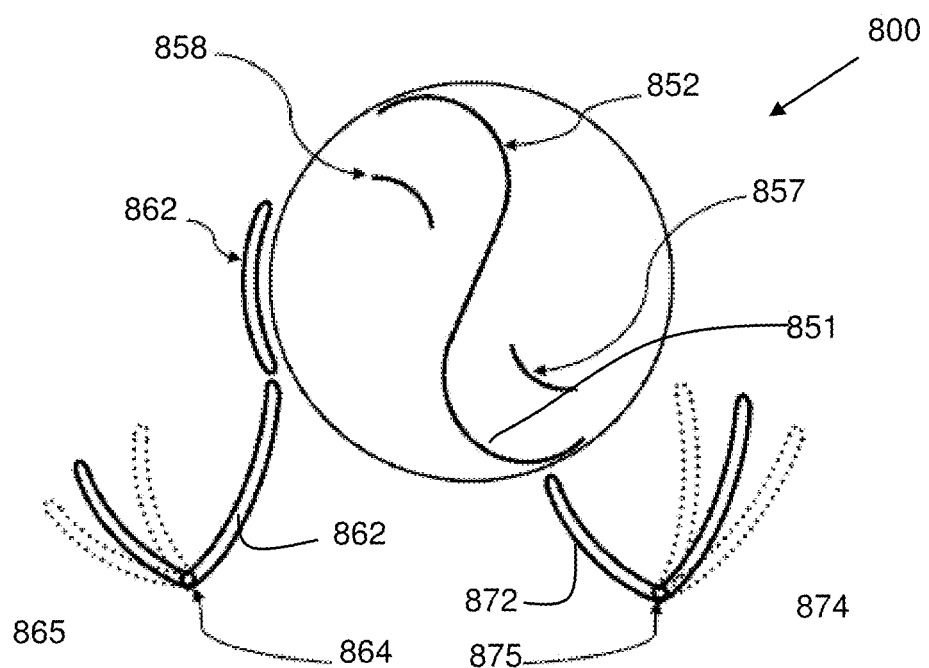
Fig. 11
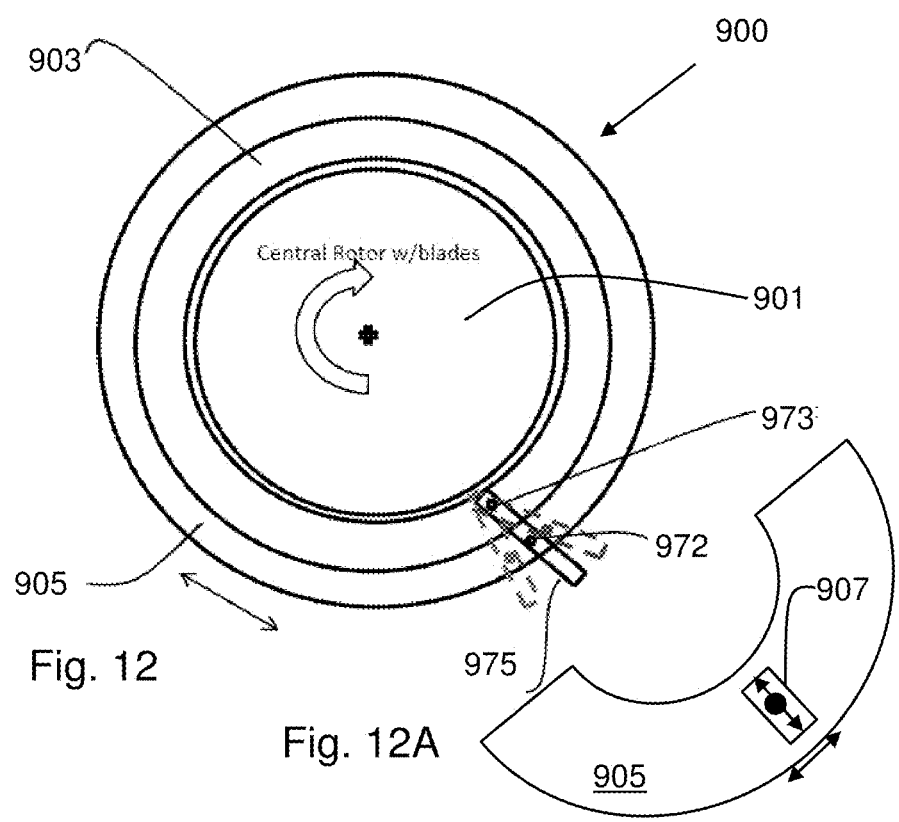
Fig. 12
Fig. 12A

WIND TURBINE GENERATORS

RELATED APPLICATIONS

This application claims benefit of priority to provisional application Ser. No. 61/208,409 filed Feb. 24, 2009; and is related to co-pending non-provisional application Ser. No. 12/386,865 filed Apr. 25, 2009, which is incorporated herein by reference.

BACKGROUND

1. Field of the Invention

The invention is directed to the field of wind turbine generators and more specifically to the area of techniques that improve the operating efficiencies of such turbines.

2. Description of the Prior Art

Although wind can be found everywhere on the planet, and is always blowing somewhere, it is erratic. It is erratic as to where it blows, when it blows, at what speed it blows, the length of time it blows and what kind of wind it is ... steady, gusting, changing direction ... or all at the same time. This erratic factor is constantly (conveniently) overlooked when manufacturers and government reports on wind energy claim energy efficiencies from wind turbines. Large 3 bladed horizontal axis wind turbines ("HAWT") require a "clean" flow of air in a narrow window of speed (generally 10-28 mph) to efficiently produce energy from wind. This is due to the basic design of the turbine and their outdated generators.

Manufacturers have greatly increased the size of their turbine blades and the height of their masts to try and reduce the negative effects of these issues. The wind blows stronger at higher heights above the ground and larger blades more efficiently capture the wind's energy. They are close to the limit of negative return because of the greatly increased weight of the blades and the large increase in initial, shipping, installation and maintenance costs.

The maximum efficiency of a three bladed HAWT is about 45%, if wind is constantly blowing at 18 mph. If one considers typical fluctuating wind energy, the average efficiency drops to about 25%. To be truly efficient a turbine has to operate over a much larger wind speed range and in all types of wind.

Large numbers of 3 bladed HAWTs have been successfully installed worldwide to meet the strategic need to reduce dependency on foreign oil and reduce carbon emissions from coal and oil fired electricity generation plants. However, they are all remarkably similar in overall design and component design and layout.

Although commercially successful, largely due to subsidies, 3 bladed HAWTs have several major issues:
High product, shipping, installation and maintenance costs
Narrow operational window (wind speeds of 10-28 mph=5-13 m/s)
Inability to operate effectively in "turbulent" air
Large land usage requirements (about 5 acres per Megawatt)
Installation sites typically far from users
Environmental and health issues (noise, flicker, wildlife, etc.)
Supply chain and delivery issues (weights of approximately 125 tons and 8000 parts)
Regulatory issues (large delays to obtain licenses)

It is well known that three bladed HAWTs produce electricity in response to wind motion over their blades and are designed to operate within a narrow range of wind velocities (design window). Wind that is too low in velocity (below the window) will not be sufficient to cause the blades to turn. Wind that is too strong (above the window) causes associated sensors to feather the blades or apply brakes to prevent the blades from turning. Otherwise, the blades would turn to turn too fast for safe operation. (Because wind turbine generators are not in operation when the wind velocity is outside the design window, they generally have low operating efficiencies.) Consequently, the placement of wind turbine generators is critical to their output efficiencies and locations are chosen in which the velocity of wind is predominantly within the design window. The most ideal site would be one where the wind velocities are constantly occurring and remain in the upper range of the design window.

Current 3 bladed HAWTs use generators essentially the same as those powered by diesel engines in the 1940's. They generally weigh about 15 tons and require huge inefficient gearboxes to convert the slow turning propeller blade (80 rpm) shaft to 2000 rpm's to generate electricity. This transmission configuration is the main cause of the 3 bladed HAWTs inability to generate electricity in less than a 10 mph wind and to close down above 30 mph.

Prior art vertical axis wind turbine ("VAWT") designs, such as is shown in FIG. 1, have been found to be successful in eliminating some of the major issues experienced with 3 bladed HAWTs and at a significantly lower cost. Vertical axis wind turbines (also generally known as Savonius turbines) produce large amounts of torque over a wider range of wind speeds as compared to HAWTs. However, the basic efficiency (ability to capture wind energy) of conventional VAWTs is low when compared to horizontal axis turbines.

SUMMARY OF THE INVENTION

In the present invention improvements are disclosed with regard to higher efficiency VAWT generators. The mounting and configuring of individual turbine modules is disclosed to provide greater power from a smaller footprint and to more efficiently convert wind energy into electrical energy.

The present invention improves on the simplest vertical axis wind turbine operation which is based on the difference of the drag at each side of its semi-circular half cylinder blade. The advantage of this type of wind turbine is that it can operate in a wider range of wind speeds, can operate in turbulent air, can operate efficiently at ground level, is self-starting, and independent of the wind direction.

The present invention provides innovative modifications to the design of the blades, both front and rear to optimize the concave wind striking surface and the wind deflecting convex surface. In addition, fixed outer vanes are shown to concentrate wind pressure to selected portions of the turbine blades and thereby achieve significant improvements in power coefficients of VAWTs. Outer vanes may be either fixed, or adjustable.

Embodiments are included which provide arrays of individual VAWT modules that are directionally sensitive and in stacking configurations to illustrate the significant accumulated efficiencies.

Further efficiencies are achieved by integrating a high density printed armature generator with the improved turbine. A high density, flat motor type, printed armature electric generator is disclosed that has a 20× improvement in power density over current designs. This generator is extremely compact and lightweight and can produce electrical energy at speeds from 1 or 2 rpm and into the 100 s of rpms with power ratings up to 500 kW. For example a 160 hp generator can produce 120 kW and in this configuration is expected to be no more than 14" in diameter about 5" tall, including its own bearings and electronic control system. Since this generator does not require a gearbox and can be mounted within the turbine housing or mounted at ground level, it will simplify both installation and servicing.

Although referred to as vertical axis turbines, the individual VWAT turbines can be produced as individual power modules that can be mounted to rotate about a vertical or horizontal axis and in a wide range of environments. Arrays of turbine modules allow for more power to be generated from a smaller footprint.

As detailed below, vertical axis wind turbines can operate on, in and between existing buildings and structures. They can be sited where the energy is required, in order to provide distributed power and potentially eliminate new transmission lines and their associated losses. Also, vertical axis wind turbines utilizing the fixed vane technology of the present invention can be integrated into building structures. They can take advantage of additional wind generated by the wind pressure differentials created by the buildings themselves It is an object of the present invention to increase the output efficiencies of wind turbine generators by providing vertical axis turbines with enhanced blade configurations.

It is an object of the present invention to provide additional blades in a Savonius type turbine to increase its efficiency.

It is another object of the present invention to provide stationary outer deflector vanes for concentrating wind pressure to the inner rotating blades of a VAWT.

It is a further object of the present invention to provide an improved electrical generator that is both light weight and efficient and does not require an energy robbing gearbox.

BRIEF DESCRIPTION OF THE DRAWINGS

FIG. 11 is a top plan view of a VWAT module embodiment with adjustable stationary wind vanes.

FIG. 12 is a top plan view of a VWAT embodiment illustrating a mechanism for adjusting stationary wind vanes.

FIG. 12A is an enlarged view of a portion of the adjustment mechanism of FIG. 12.

DETAILED DESCRIPTION OF THE EMBODIMENTS

Figure 1:
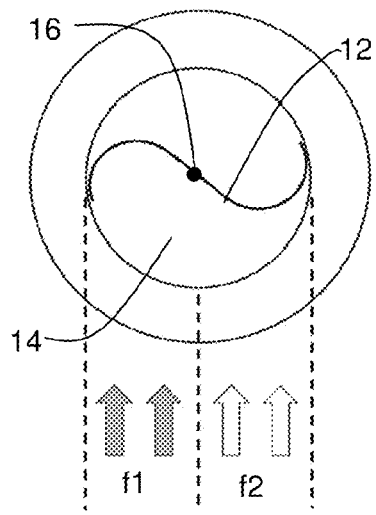
FIG. 1 is a top plan view of a prior art Savonius type VWAT.

In FIG. 1, a prior art Savonius type VWAT 10 is shown. Typically, such a VWAT contains a blade 12 that extends vertically parallel with an axis 16 and has an "S" shaped cross-section, wherein the tips of the blades lie along the diameter of a defined cylinder. Blade 12 extends vertically from a rotor 14 to rotate about an axis 16. Although wind forces f1 and f2 shown in the drawings are equal, the resulting effect on the blade 12 is uneven. Wind forces f1, incident on the concave surface of blade 12 are greater than the wind forces f2 applied to the convex portion, since the concave portion tends to collect the forces and the convex portion tends to deflect the forces. The resulting differential results in an imbalance of forces on blade 12 and rotation of rotor 14.

Savonius wind turbines are well known for their compactness and relative efficiencies during a wide range of wind speeds from various directions. Savonius turbines are one of the simplest turbines and are considered "drag" type devices. They typically consist of two or more "C" shaped blades having an "S" cross-sectional shape when viewed along its vertical axis of rotation. The backs of the blades do not help with rotation and are typically designed to shed air so as not to increase drag on the turbine. Since the "C" shaped blades collect wind forces directed against their surfaces and the forces are greater on those surfaces than the backs of the blades, the differential in applied forces causes the blades to turn. While the Savonius type VWAT shown in FIG. 1 is typically used because of its omni-directional properties—the ability to be driven by wind forces from any direction—it is somewhat inefficient because its power is the result of the force differentials applied to the convex and concave portions of the rotating blade. Therefore, the speed of the turbine is always less than the wind speed.

Figure 2:
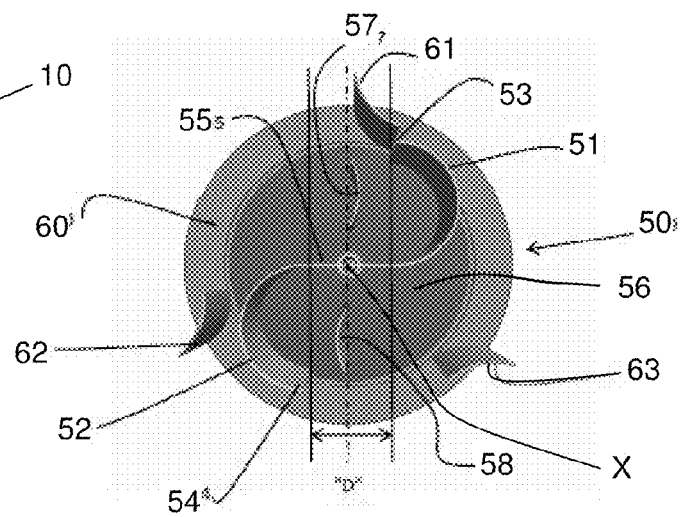
FIG. 2 is a top plan view of a two bladed VWAT embodiment of the present invention containing a plurality of outer stator wind vanes and secondary rotor blades.

One embodiment of the present invention, shown in FIG. 2, provides improvements to the operation of traditional Savonius type VWATs. A 2-blade turbine 50 is shown with a pair of primary rotor blades 51 and 52 on a rotor 56. Blades 51 and 52 are substantially semi-circular in cross-section (half a cylinder). Blades 51 and 52 are joined across the axis "X" by an extension piece 55 to create an off-set from the axis X. The offset "D" is shown as the distance the outer edges 53 and 54 of the blades 51 and 52 are from a common diameter line. An additional improvement includes a set of secondary rotor blades 57 and 58 located in advance of the concave portion of each primary rotor blade. Secondary rotor blades 57 and 58 are also attached to the rotor 56, and function to improve air flow while providing additional surface area for the impinging air flowing into the turbine. Another improvement includes a plurality of fixed stator vanes 61, 62 and 63 mounted on a fixed platform 60 equally spaced around the outside of rotor 56. Fixed stator vanes 61, 62 and 63 are slightly curved in the direction of rotation when viewed from outside the turbine. The function of the stator vanes is to improve air flow by deflecting wind towards the concave portion of the blade and secondary vane positioned in front of the concave blade portions and away from the convex portions of the blade as it rotates. In this embodiment, the VWAT displays increased performance while maintaining its omni-directional properties.

It should be noted that there are several variations in numbers of blades and fixed stator vanes that can be adapted to the disclosed invention. In the embodiments shown, it has been found that the following arrangements are acceptable for the desired performance characteristics: Two rotor blades require at least three fixed stator vanes. Three rotor blades require six fixed stator vanes. Four rotor blades require eight fixed stator vanes, etc. There may be minor efficiencies in increasing the number of fixed stator vanes in each embodiment; however, one must weigh the costs of such additions vs. the efficiencies achieved.

Figure 3:
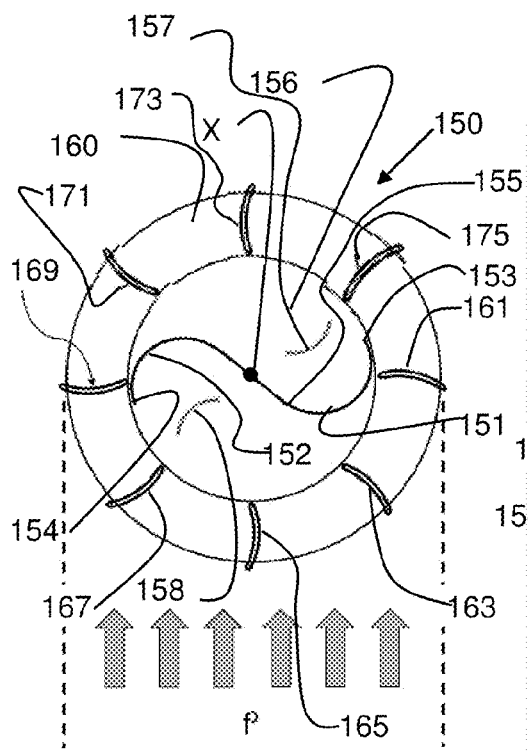
FIG. 3 is top plan view of a two bladed VWAT embodiment of the present invention containing a plurality of outer stator wind vanes illustrating the effects of wind flow.

In the embodiment of FIG. 3, a VWAT 150 similar to that shown in FIG. 2 is shown. In this embodiment, several fixed stator vanes 161, 163, 165, 167, 169, 171, 173 and 175 are disposed on a stationary platform 160, around rotor 156. In the position shown, fixed stator vanes direct wind "f" flowing towards the concave surface of rotor blade 152 and deflect wind from the convex surfaces of blade 151. The result is that the wind is deflected generally in the direction of rotor rotation to result in concentrated wind forces present on the concave (front) surfaces of secondary blades 158 and 157, as well as primary blades 152 and 151 as they rotate about axis "X", while minimized opposing wind force vectors present on the convex (back) surfaces of blades 151 and 152. The result is that the differential forces are increased and the wind forces present on the front surfaces of the rotor blades are increased. The distance between the rotating tip 154 of blade 152 and tip 153 of blade 151, are spaced from the stationary vanes on platform 160 so as to allow for expansion during high operating speed or ambient temperatures. Although the wind is indicated as coming from a single direction in the FIG. 3 embodiment, it can be seen that this embodiment is equally sensitive to wind coming from all directions and therefore maintains its omni-directional characteristics.

Figure 4:
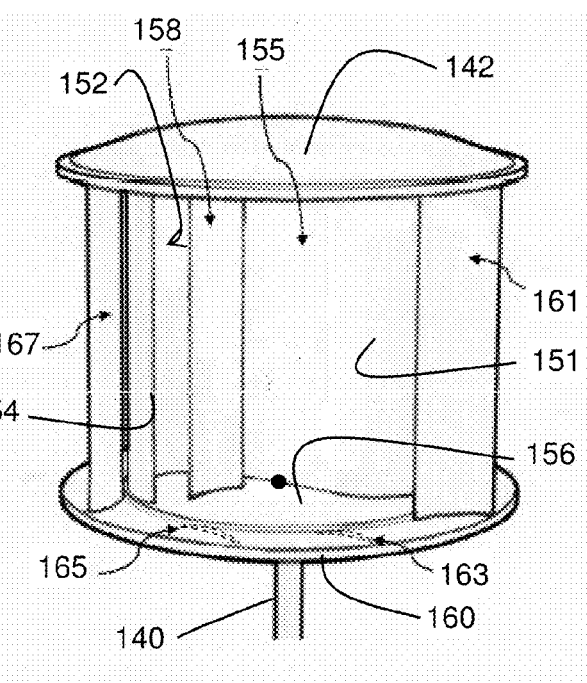
FIG. 4 is a perspective view of the VWAT with several outer stator wind vanes removed.

FIG. 4 shows a partial cut-away of the VWAT in FIG. 3 with stationary vanes 163 and 165 removed. This view allows one to see how the VWAT can be mounted on a mast 140 with a cover 142. In this case the cover 142 is supported by stationary vanes 161, 163, 165, 167, 169, 171, 173 and 175. Primary rotor blade 152 is shown adjacent to its secondary blade 158, both mounted on rotor 156.

Figure 5:
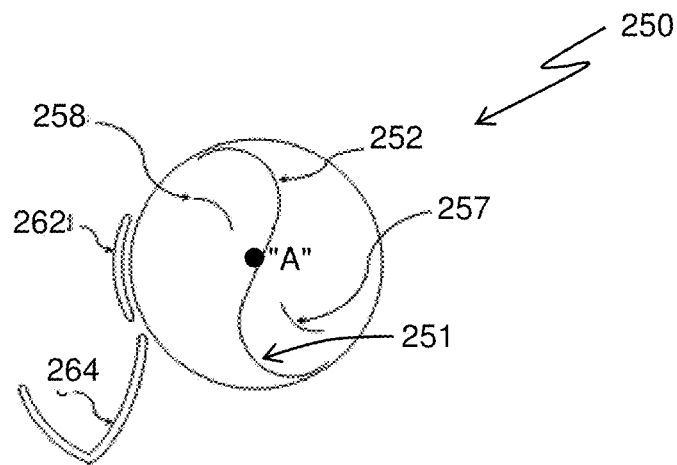
FIG. 5 is top plan view of a two bladed VWAT embodiment of the present invention containing a plurality of secondary rotor blades and an outer stator wind vane.

FIG. 5 illustrates another embodiment of the present invention wherein a set of deflector vanes 264 and 262 are provided on one side of a VWAT module 250 to enhance the diversion of air into the power slot of the turbine. In this embodiment, the turbine 250 is a unidirectional turbine and must be adjustably rotated to have the wind forces vectored into the power slot defined between the vanes 264 and 262 and rotor axis "A". VWAT module 250 module is shown to have primary rotor blades 251 and 252 as well as secondary rotor blades 257 and 258 mounted on rotor 260.

Figure 6:
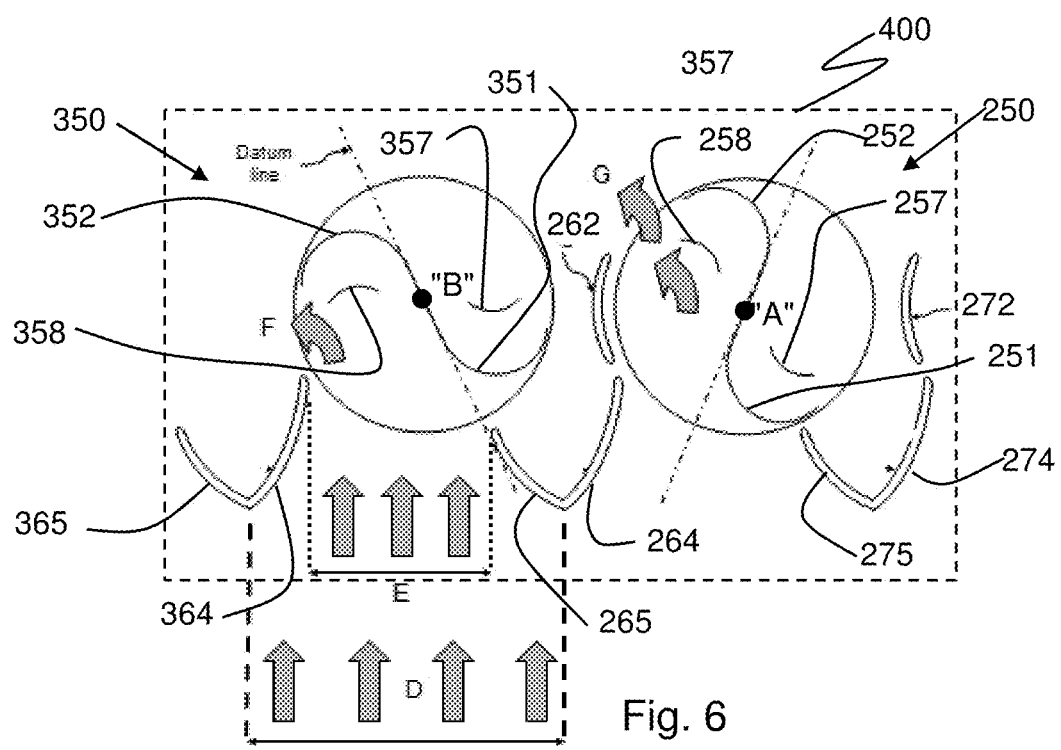
FIG. 6 is top plan view of a two module array of VWATs with outer stator wind vanes illustrating the effects of wind flow.

FIG. 6 illustrates an array 400 of VWT modules 250 and 350 disposed adjacent to each other to define a unidirectional turbine. In this case, each module has a set of two stationary vanes that both divert air flow into the power slot and away from the drag portion of the rotating blades before they enter the power slot. For instance, in the position illustrated, stationary vanes 275, 264 and 262 concentrate wind forces into the power slot defined between vane 262 and the axis "A", causing the primary and secondary rotor blades 252 and 258 to rotate in a clockwise direction. a Meanwhile, stationary vanes 274 and 272 divert wind forces away from primary blade 251 until primary blade 251 rotates into the power slot where wind forces impinge on its concave surface. At the position shown in FIG. 6, the angular rotation of the rotor blades 252 and 258 in turbine module 250 are at the end of the power stroke and the air exits at "G", with fixed stationary vane 262 in place. In the array 400, VWAT module 351 is shown to have its rotor blades advanced with respect to the blades in module 250. VWAT 350 is depicted with stationary vanes 364 and 265 to concentrate wind force into the power slot. The concentration of wind forces provides increased wind speed due to the venturi effect, which translates to higher forces onto the rotor blades. Wind initially impinges on secondary rotor blade 358 and primary rotor blade 352. In this depiction, the angular rotation of the turbine 350 is also at the end of the power stroke, since the air exits "F". In each turbine it can be seen that the use of a secondary rotor blade provides enhanced efficiencies due to its location in front of the primary rotor blade in a manner to continue to receive wind forces when the primary blade has been rotated to a point where it is no longer exposed to wind forces.

Figure 7:
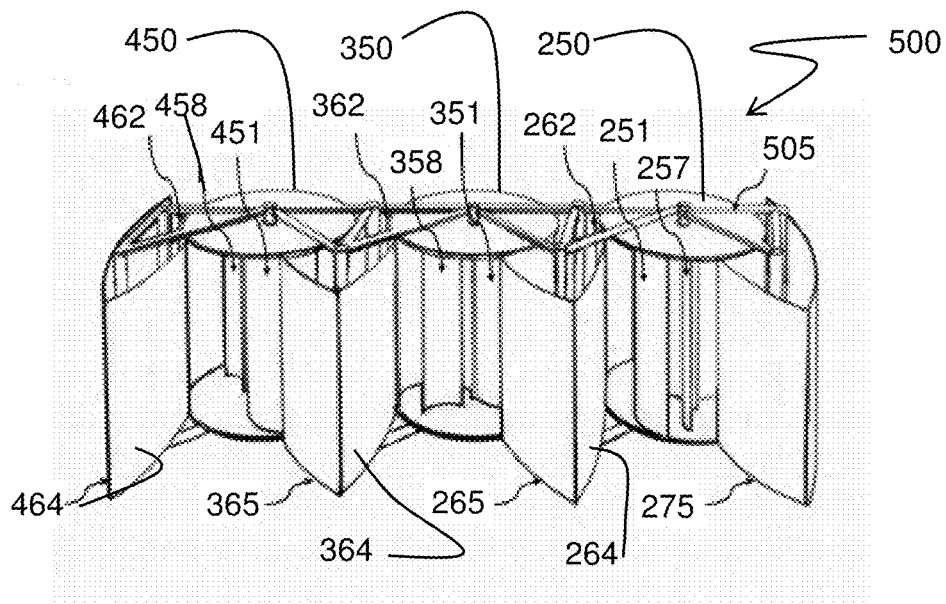
FIG. 7 is a perspective view of a three module array of VWATs with outer stator wind vanes.
Figure 8:
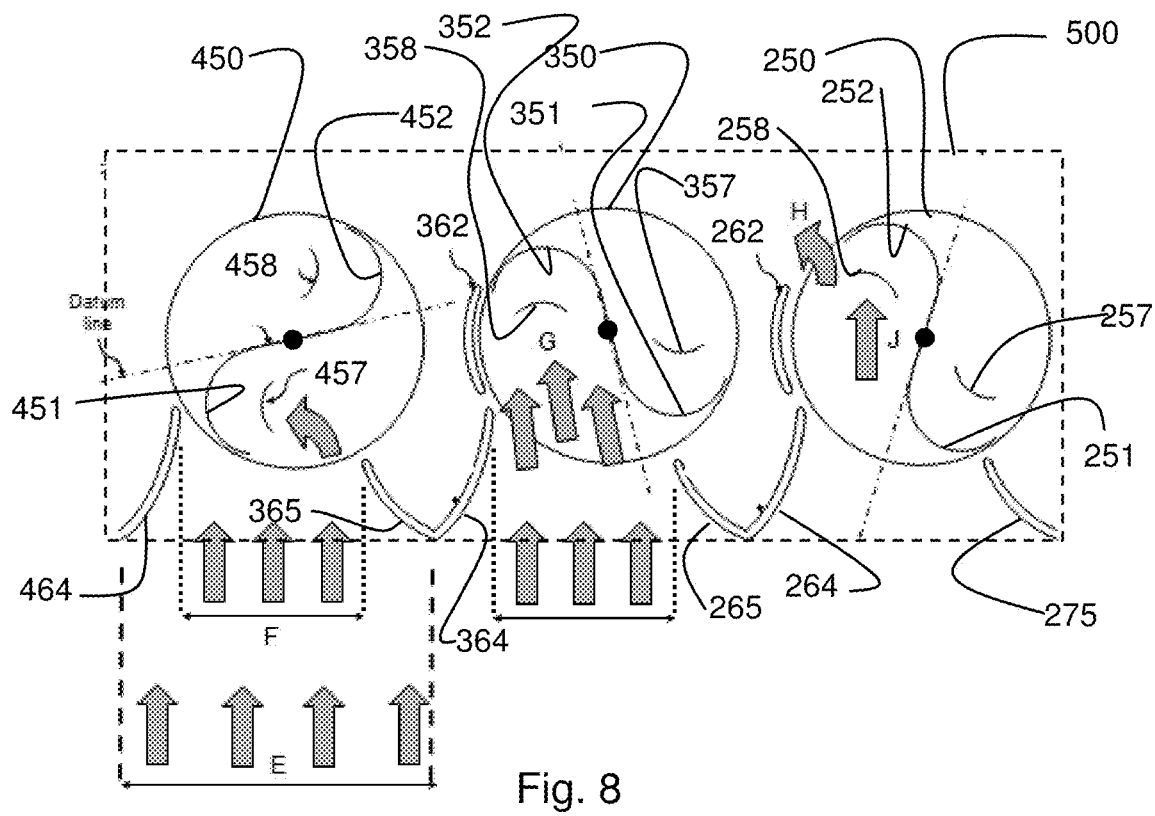
FIG. 8 is top plan view of the three module array shown in FIG. 7 illustrating the effects of wind flow.

FIGS. 7 and 8 illustrate another embodiment of the present invention in which three VWATs are provided in a linear array 500. A framework 505 provides a rigid mounting for the three turbine modules and the associated stationary vanes set up the unidirectional properties for this embodiment. Turbine module 450 contains stationary vanes 464 and 365 which deflect incoming wind "E" to be concentrated at "F", and thereby create a Venturi effect. At the same time, stationary vane 365 deflects the wind towards the defined power slot to decrease drag on the convex back side of blade 452 as it rotates towards the power slot. The position of blades in turbine module 450 represents the start of the power stroke, wherein secondary rotor blade 457 is the first surface to receive the wind energy.

Turbine module 350 is shown to represent the turbine's angular rotation at its maximum power generation. In this position, stationary vanes 364 and 362 define the outer flow guide for wind into the defied power slot. By using a vane 362, as shown, the power slot is extended to provide a longer duration of power applied to the rotor blades 352 and 358. Stationary vane 265 acts a vane 365 does with respect to module 450 to divert wind forces away from the back side of primary blade 351.

Turbine module 250 contains all the same elements as turbine module 350 but has its rotor blades oriented to be at the end of it power stroke when turbine module 350 is at its maximum. By orienting the turbine blades at staggered angles of orientation with respect to one another, the power provided by the array can be more evenly distributed with lower peak variations.

Figure 9:
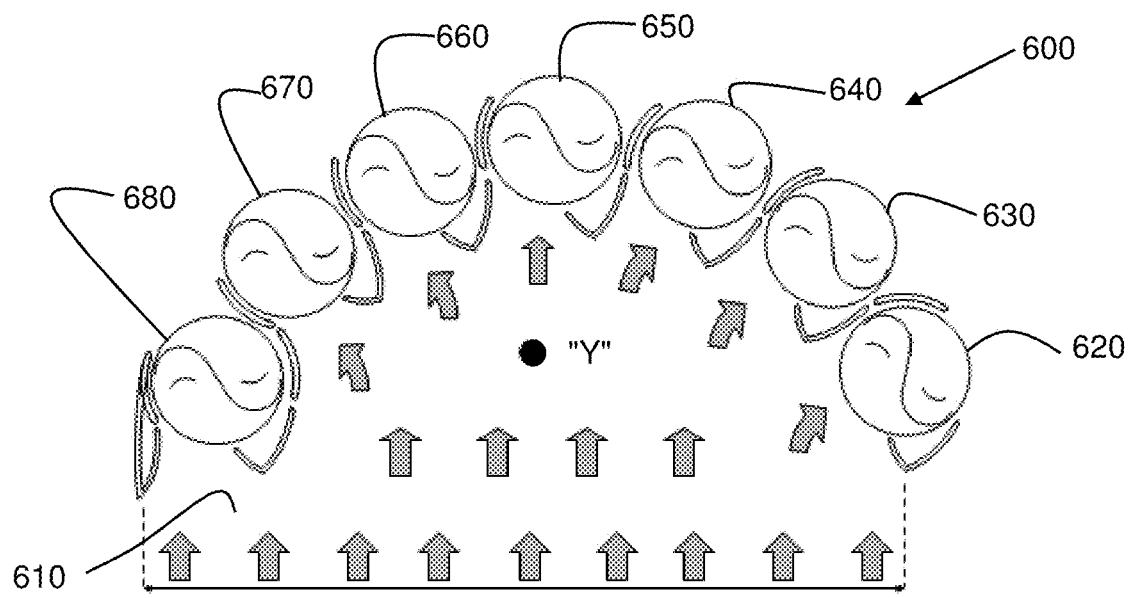
FIG. 9 is a top plan view of arcuate arrays of VWAT modules, illustrating the effects of wind flow.

Turbine arrays can be configured in a variety of formats. FIG. 9 illustrates a semi-circular format which helps to contain the wind, and stabilize the constantly varying wind pressures experienced by turbines. The stabilized air pressure in turn leads to more consistent rotation of the turbines resulting in the generation of "cleaner" electricity. In this embodiment, VWAT modules 620, 630, 640, 650, 670 and 680 are disposed on a platform 610 which is pivoted to rotate about an axis "Y". In this manner, the array can be oriented to the direction of wind flow in order to maintain maximum efficiency.

Figure 10:
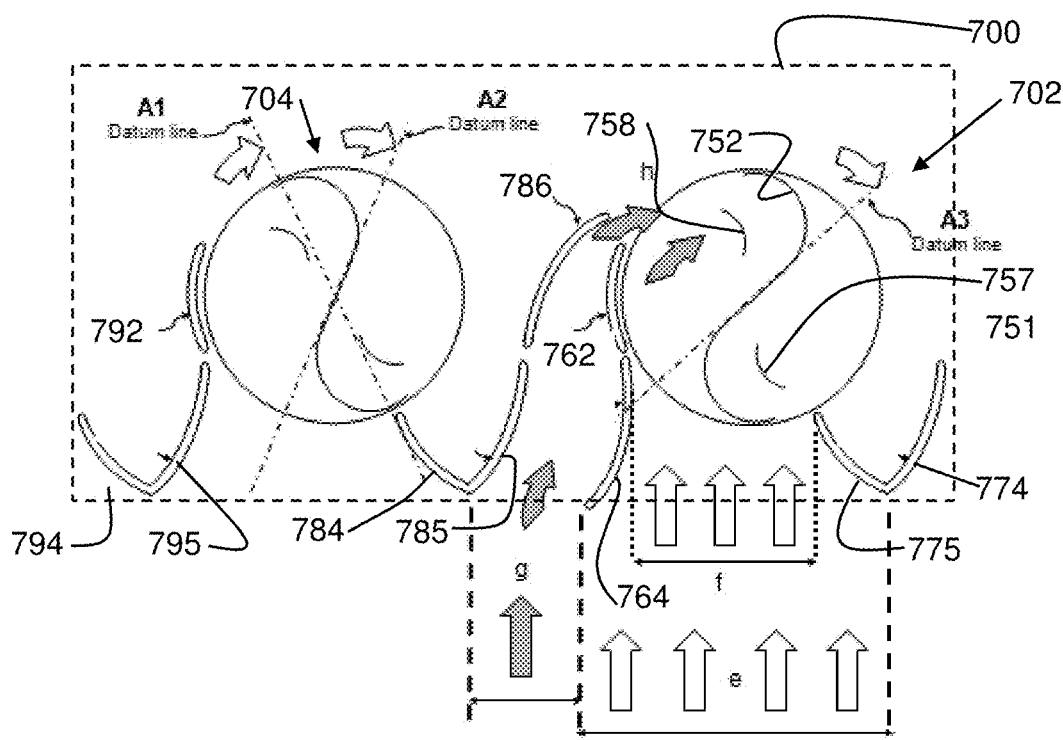
FIG. 10 is a top plan view of a two module array embodiment of VWATs with a secondary duct formed by stationary wind vanes.

FIG. 10 illustrates a further embodiment of the present invention, wherein an additional wind flow path is set up between adjacent VWAT modules in order to increase the power factor of wind/air flow into the turbine. A turbine array 700 is shown which includes a pair of turbine modules 702 and 704. While the stationary vanes 762, 764, 775, 774, 784, 792 and 795 are essentially the same as their counterparts in earlier described embodiments, an additional flow path is shown which is defined by stationary vanes 785, 786 and the back sides of vanes 764 and 762. This additional flow path "g" ducts and compresses air flow that is not diverted into the power slot and leads it to the rear of the turbine where it is ducted in at higher speed to the rotating blades (758 and 752 in the position illustrated). This embodiment provides not only the enhanced power from vane diverted wind into the defined power slot described above, but also provide additional power be introducing wind forces beyond the defined power slot. In this manner, the ducted air tends to hold the diverted and compressed air in the turbine for an extended period to provide additional power.

While the foregoing embodiments illustrate how one can enhance an dramatically improve the operational efficiencies of VWATs, at times it may be necessary to adjust the angle of the stationary wind vanes that divert wind into the turbine. In FIG. 11, a turbine 800 is shown in which stationary wind vanes 865 and 862 are mounted on a hinge 864. Similarly, stationary wind vanes 872 and 874 are mounted on a hinge 875. Depending on the installation, adjustments of these stationary wind vanes may be manually set or remote controlled to accommodate variations in wind strengths.

In FIGS. 12 and 12A, a mechanism 900 is illustrated in which stationary wind vanes (one shown) 975 may have their angles of deflection changed. Central turbine rotor 901 is shown to be surrounded by a stationary platform 903. A control ring 905 is shown to surround platform 903. Each stationary wind vane 975 is mounted on a pivoting pin 973 extending from stationary platform 903 and contains an adjustment pin 972 which extends from the vane into a slot 907 formed in ring 905. Through a control mechanism, (not shown) it is possible to rotatable move the control ring 905 with respect to the stationary platform 903 until the vanes are adjusted as desired to change their respective angles of deflection. Movement of control ring 905 may be by a manual or remote adjustment.

Figure 13:
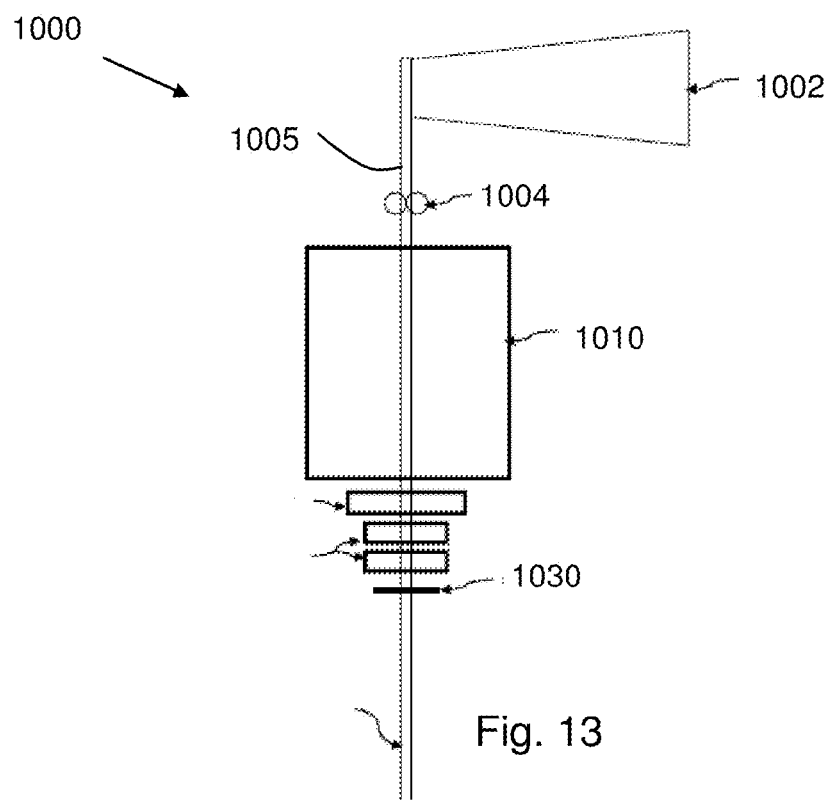
FIG. 13 is a plan view of a VWAT generator assembly.

FIG. 13 illustrates a side elevation of a single VWAT 1000 having its turbine 1010 connected to a drive shaft 1050 which rotates when wind energy spins the turbine blades. A wind direction flag 1002 provides orientation of the turbine, while anemometer 1004 provides wind speed information to a controller (not shown). During average wind conditions the rotation of the turbine 1010 and drive shaft 1050 transmits energy to a main generator 1020 which converts the mechanical energy into electrical energy.

During low wind conditions, sensed by anemometer 1004, the main generator 1020 may be electronically disconnected from drive shaft 1050 and one or more of the secondary generators 1022 is electronically connected to drive shaft 1050. The secondary generators 1022 are considerably smaller than the main generator 1020 and have much lower resistance to allow the production of electricity at very low wind speeds. When the wind speed increases to a predetermined level the secondary generator(s) 1022 is(are) electronically disconnected from drive shaft 1050 and the larger main generator 1020 is electronically connected.

During very high wind conditions, main generator 1020 remains coupled to the drive shaft 1050 and the secondary generators 1022 are also electronically coupled to the drive shaft, allowing the increased energy load to be absorbed and converted into electrical energy.

During exceptionally high winds, a further step can be taken. The turbine has an electric brake 1030 mounted to drive shaft 1050. Brake 1030 is used to stop the turbine for servicing and in emergency situations. When the wind speed reaches a predetermined limit and all of the generators have reached their maximum energy loadings electric brake 1030 is automatically engaged to slow the rotation of the turbine. This would normally cause energy to be lost as heat energy. But electric brake 1030 is a regenerative brake, able to convert at least 50% of the braking force into usable electrical energy.

This configuration of multiple generators and regenerative electric brake allows the turbine to produce electrical energy in very low wind speeds through exceptionally high wind speeds greatly increasing its effective operational window.

Figure 14:
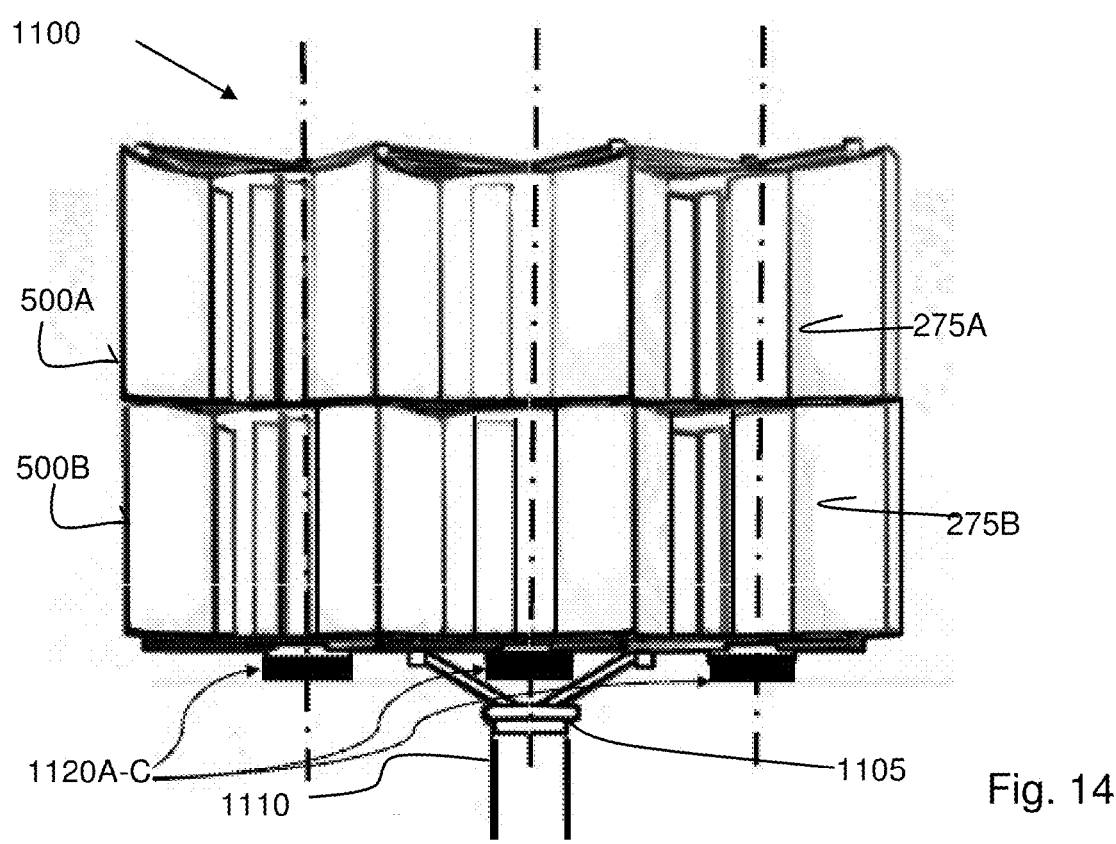
FIG. 14 is a plan view of a mast mounted array of VWAT generators.

FIG. 14 presents a further array configuration of VWATs in which linear arrays, such as shown in FIGS. 7 and 8 are stacked in vertical alignment. Electrical generators 1120A-C are shown to be associated with each stack of turbines. Mast 1110 and bearing 1105 serve to provide the necessary support to the array and provide for rotation of the array into the direction of incoming wind.

As can be seen by the drawings and accompanying explanation, the present invention is a unique improvement over conventional wind turbine generating systems. And while the embodiments shown here are preferred, depending on the engineering applications and requirements, they shall not be considered to be a restriction on the scope of the claims set forth below.

I claim:

1. A wind turbine comprising;
a rotor element including a pair of primary blades formed as semicircular half cylinders having outer ends near the periphery of said rotor element, wherein each semicircular half cylinder has a wind receiving concave front surface and a wind rejection rear surface, wherein said wind receiving concave front surfaces are oriented to receive wind/air flow into said turbine and reactively move in a predetermined rotational direction around an axis of rotation in response to forces provided by said wind/air flow, wherein said half cylinders are joined by a straight wall extension that offsets said semicircular half cylinders from said axis of rotation by a predetermined distance;
a pair of curved deflector vanes mounted in a stationary location with respect to said rotor element and oriented parallel to said axis to concentrate said wind/air flow into a power slot in which said concave front surfaces are exposed and to decrease drag on said rear surfaces approaching said power slot;
wherein said turbine is unidirectional with the deflector vanes being oriented on a side of said rotor element into a direction of said wind/air flow.

2. A wind turbine as in claim 1, wherein said rotor element further includes a pair of secondary blades having concave front surfaces and mounted on said rotor element radially spaced on opposite sides of said straight wall extension spaced in front of said front surfaces of said primary blades within said predetermined distance.

3. A wind turbine as in claim 1, wherein said axis is vertical.

4. A wind turbine as in claim 1, said wind rejection rear surface of said primary blades has a convex shape for diverting wind forces.

5. A wind turbine as in claim 1, wherein said at least one of said deflector vanes is pivotable to provide a variable width of said power slot and a variable angle of deflection to accommodate variations in wind strength.

6. A wind turbine comprising;
a rotor element including a pair of primary blades, each primary blade having a concave front surface oriented to receive wind/air flow into said turbine and reactively rotate about an axis in response to said wind/air flow, and an air shedding rear surface that is generally convex, wherein said concave front surfaces form semicircular half cylinders and each half cylinder is joined to the other by a straight wall extension that traverses said rotational axis and offsets said semicircular half cylinders from said rotational axis by a predetermined distance;
wherein said rotor element further includes a pair of secondary wind driven blades mounted on said rotor element radially spaced on opposite sides of said straight wall extension and spaced in front of said front surfaces of said primary blades within said predetermined distance to continue to receive wind forces when said primary blades have rotated to a position no longer exposed to wind forces; wherein said secondary set of wind driven blades are smaller than said primary blades.

7. A wind turbine as in claim 6, wherein said rotational axis is vertical.

8. A wind turbine as in claim 6, further comprising a pair of stationary deflector vanes to concentrate said wind/air flow into a power slot in which said concave front surfaces are exposed, wherein at least one of said deflector vanes is pivotable for being oriented in a direction of said wind/air flow and provide a variable angle of deflection and change the width of the power slot to accommodate variations in wind strength.

9. A wind turbine as in claim 8, in which a plurality of rotating rotors having corresponding primary and secondary blades mounted in an array for rotation about parallel axes are configured in an array; and at least two deflector vanes are associated with each rotor.

10. A wind turbine as in claim 8, wherein said deflector vanes are adjustable to select the desired amount of wind/air flow deflection.

11. A wind turbine as in claim 8, wherein at least one of said deflector vanes functions to divert a portion of wind/air flow away from the rear surface of said primary blade as it rotates towards said wind/air flow.

12. A wind turbine as in claim 8, wherein at least one of said deflector vanes functions to compress a portion of diverted wind/air flow into the front surfaces of said turbine blades exposed to said wind/air flow.

13. A wind turbine as in claim 8, further comprising a deflector vane that functions to extend the flow path of said concentrated air through said turbine by containing said concentrated air against said front surfaces of said blades over an extended distance.

14. A wind turbine as in claim 13, further including at least one secondary deflector vane that functions to duct and compress a portion of said wind/air not being diverted by said pair of deflector vanes into a portion of said turbine that resides behind and beyond said power slot, and in the rotational direction of said blades and rotor.

15. The wind turbine as in claim 9 wherein each rotor in said array shares a deflector vane with an adjacent rotor in said array.

16. A wind turbine array comprising:
a framework;
a plurality of rotor elements mounted to the framework, each rotor element including a pair of primary blades formed as semicircular half cylinders having outer ends near the periphery of said rotor element, wherein each semicircular half cylinder has a wind receiving concave front surface and a wind rejection rear surface, wherein said wind receiving concave front surfaces are oriented to receive wind/air flow into said turbine and reactively move in a predetermined rotational direction around an axis of rotation in response to forces provided by said wind/air flow, wherein said half cylinders are joined by a straight wall extension that offsets said semicircular half cylinders from said axis of rotation by a predetermined distance; and
a plurality of deflector vanes mounted to the framework to concentrate the wind/air flow into a respective power slot of each rotor element in which the concave front surfaces are exposed and to decrease drag on the rear surfaces approaching the power slot;
wherein deflector vanes positioned between adjacent rotor elements in the array share a common edge dividing the wind/air flow into the adjacent rotor elements;
wherein the wind turbine array is unidirectional with the framework being oriented in a direction of the wind/air flow; and
wherein the rotor elements and deflector vanes are constructed as a plurality of modules, each module consisting of a single rotor element and a pair of deflector vanes sharing a common edge to one side of said single rotor element, so that when placed in said array a respective power slot for each rotor element has an edge defined by a deflector vane of an adjacent module.

17. The wind turbine array of claim 16 wherein the framework is mounted on a bearing for rotating into the direction of the wind/air flow.

18. The wind turbine array of claim 16 wherein each module includes a hinge at the common edge so that at least one of the deflector vanes of each pair has an adjustable deflection angle to accommodate variations in wind strength.

* * * * *